(12) United States Patent
Ota

(10) Patent No.: US 6,402,671 B1
(45) Date of Patent: Jun. 11, 2002

(54) TOOL-EXCHANGE APPARATUS FOR MACHINE TOOL

(75) Inventor: Hidehito Ota, Nara (JP)

(73) Assignee: Mori Seiki Co., Ltd., Yamatokoriyama (JP)

(*) Notice: Subject to any disclaimer, the term of this patent is extended or adjusted under 35 U.S.C. 154(b) by 0 days.

(21) Appl. No.: 09/652,014

(22) Filed: Aug. 31, 2000

(30) Foreign Application Priority Data

Sep. 2, 1999 (JP) ............................................ 11-248213

(51) Int. Cl.$^7$ ............................................... B23Q 3/157
(52) U.S. Cl. ............................. 483/39; 483/66; 483/67
(58) Field of Search ............................ 483/67, 29, 55, 483/24, 61, 58, 16, 17, 14, 1, 36, 51–53, 66; 29/39

(56) References Cited

U.S. PATENT DOCUMENTS

| | | | | |
|---|---|---|---|---|
| 4,218,816 A | * | 8/1980 | Dormehl | 483/24 |
| 4,414,724 A | * | 11/1983 | Garnett | 29/39 |
| 4,719,691 A | * | 1/1988 | Klingel | 483/29 |
| 6,228,006 B1 | * | 5/2001 | Horn et al. | 483/55 |

FOREIGN PATENT DOCUMENTS

| | | | | |
|---|---|---|---|---|
| DE | 4416712 | * | 11/1994 | 483/672 |
| JP | 2-198738 | * | 8/1990 | 483/67 |
| JP | 40 6182646 | * | 7/1994 | 483/672 |
| JP | 08-229766 | | 9/1996 | |
| JP | 08-150530 | | 11/1996 | |
| JP | 09-108976 | | 4/1997 | |
| SU | 1563891 | * | 5/1990 | 483/672 |
| WO | 98/38006 | * | 9/1998 | 483/67 |

* cited by examiner

Primary Examiner—William Briggs
(74) Attorney, Agent, or Firm—Armstrong, Westerman & Hattori, LLP

(57) ABSTRACT

A tool-exchange apparatus making an area to install a whole machine tool compact and facilitating a attachment/detachment and a maintenance and the like of a tool. The tool-exchange apparatus includes a plurality of tool pots 10 respectively having tool storage portion 10a. The tool pot 10 is indexed at an indexing position for exchanging tools, whereby the next tool T put in the opening of the tool storage portion 10a is exchanged for the present tool T installed in a spindle. The tool pots 10 are circumferencially spaced away from each other, and an opening of each tool accommodation area 10a is centrally directed. The tools T are held by the tool pots 10 in a radial manner. The tool magazine 1 can be made compact because the tools T are radially held with the tips thereof centrally directed.

2 Claims, 5 Drawing Sheets

TOOL-EXCHANGE APPARATUS FOR MACHINE TOOL

BACKGROUND OF THE INVENTION

1. Field of the Invention

The present invention relates to a tool exchange apparatus which is installed in a machine tool and has a tool magazine for holding a plurality of tools, and which exchanges the tool held by the tool magazine for the tool installed in a main spindle.

2. Description of the Prior Art

Usually, a tool exchange apparatus is installed in a machine tool such as a machining center for exchanging a tool attached to a main spindle for another tool. There are two types in the tool magazine of such tool-exchange apparatus. One is formed of a plurality of tool pots installed in an endless chain. Another is formed of a plurality of tool pots installed in a disk-shaped pot supporter. The tool-exchange apparatus having the former transfers a tool pot installed in an endless chain to the tool exchange position in the machine tool then exchanges the present tool installed in the main spindle for the next tool held by the tool pot. Further, the tool-exchange apparatus having the latter rotates a disk-shaped pot supporter, which supports a plurality of tool pots thereon in an annular and radial manner with tips of the tools projecting out of the circle of the pot supporter outwards, to a designated angle then indexes the tool pot holding the next tool to the indexing position for exchanging the tools. There is another disk-shaped pot supporter that supports a plurality of tool pots thereon in an annular manner with tips of the tools projecting out of the surface of the pot supporter outwards in the normal line.

Thus, the tool-exchange apparatus in which the tool pots are installed in the endless chain can hold a greater number of tools. On the other hand, the tool-exchange apparatus in which the tool pots are installed in the pot supporter can speedily exchange by rotating the pot supporter at high speed so as to index the tool pots.

However, the former mentioned one type of tool-exchange apparatus can hold a large number of tools but the apparatus itself becomes large. Therefore there is a problem that a large space is necessary to install the tool-exchange apparatus in a machine tool, consequently a space to put the machine tool also becomes large. Therefore especially when constructing a manufacture line such as a transfer machine where a plurality of machine tools are arranged in a parallel manner, there is a problem that it takes long time to transfer a work and production efficiency decreases as a result. And there is another problem that an operator has to move a wide space, consequently causing a decrease of operation efficiency.

Further, among the later mentioned two types, one of tool-exchange apparatus holds the tools with tips of the tools projecting out of the circle of the pot supporter outwards, wherein the tools are held such that they project from the outer circumference of the pot supporter. Therefore the tool magazine is large and the area to install the machine tool becomes large, too, and as a result causing problems like the former mentioned tool-exchange apparatus. In the other type tool-exchange apparatus wherein the tools are held annularly erected on the pot supporter, the machine tool installing the tool magazine is so high although the area to install the machine tool doesn't become large. And as a result making difficult a maintenance work as well as a detachment of the tools from the tool pots, consequently there is a problem that production efficiency is deteriorated.

Accordingly, it is a principal object of the present invention to solve above-mentioned problems.

Another important object of the present invention is to provide a tool-exchange apparatus which can decrease an area to install a whole machine tool and can make easy a detachment of tools as well as a maintenance of the apparatus itself.

SUMMARY OF THE INVENTION

In this invention according to claim 1 to attain above-mentioned objects, a tool-exchange apparatus for a machine tool includes a tool magazine defined of a plurality of tool pots that are arranged on the same circumference of a circle equally spaced away from each other. And each of the tool pots has the opening for putting the tool therein toward the center of the circle whereby the plurality of tools are held by the tool magazine in a radial manner. When the tool pot is indexed at an indexing position, the tool-exchange apparatus exchanges the present tool installed in the spindle for the next tool held by the tool magazine with the tip thereof looking toward the center of the circle.

In this invention, the tools are held by the tool magazine in a radial manner or centripetally in such condition that tips of the tools are directed toward the center of the circle when the tools are respectively put in each opening of a plurality of tool pots. Therefore, the tools held by the tool magazine never project outside of the tool pots of the tool magazine, whereby making the tool magazine itself compact.

Thus, according to the present invention, the tool magazine can be made compact because the tools held by the tool magazine don't project outwardly, whereby a total size of the machine tool also can be made compact. As a result, an area to install the machine tool can be decreased. Therefore, when constructing a manufacture line such as a transfer machine, each machine tool can be arranged as closely as possible, an area to install the whole manufacture line can be decreased, as a result production efficiency can be improved.

Further, in the present invention according to claim 2, in a tool-exchange apparatus as set forth in claim 1, wherein the tool magazine is arranged above the work process area having the exchanging position of the spindle side in the machine tool and revolves the tool pots around the center of the circle within a horizontal plane for indexing the tool pots at the indexing position, further includes a transfer means for transferring the tool pot indexed at the indexing position to the exchanging position of the tool pot side which is located below the indexing position and a tool exchange arm which exchanges the present tool in the exchanging position of the spindle side for the next tool in the exchanging position of the tool pot side.

According to the present invention, the tool pot that holds the next tool is transferred to the exchanging position of the tool pot side located below the indexing position by the transfer means after being indexed at the indexing position by the revolution of the tool magazine in the horizontal plane above the work process area. Thereafter the tool exchange arm exchange the next tool held by the tool pot at the exchanging position of the tool pot side for the present tool installed in the spindle at the exchanging position of the spindle side in the work process area.

Thus, according to the present invention, above-mentioned tool magazine that is made compact is arranged so that it revolves in the horizontal plane in such area that the tool magazine is placed above the work process area and doesn't interrupt a work processing. Therefore a width of the machine tool can be set as close to as that of the bed of the machine tool, consequently the width of the machine tool can be decreased. Even though the tool magazine is arranged above the work process area, the tool magazine doesn't project much above the machine tool and the height of the machine tool can be decreased as a result, because the tool magazine holds the tool in a horizontal posture. Therefore, operator can easily detach the tools from the tool pot and do other maintenance work without difficulty. Further, because the tool magazine is arranged above the work process area, the operator can attach/detach the tool on/from the tool pot from the opposing side to the spindle (i.e. the front), as a result making easy the attachment and detachment of the tool.

Further, in the present invention according to claim 3, in the tool-exchange apparatus as set forth in claim 2 the transfer means comprising a engaging means in engagement with the tool pot for moving between the indexing position and the exchanging position of the tool pot side and an elevating means for moving the engaging means up and down between the indexing position and the exchanging position of the tool pot side. As a result making the tool pot not project from the side of the machine tool while transferring the tool pot indexed at the indexing position, consequently the area to install the machine tool can be decreased.

DESCRIPTION OF THE PREFERRED EMBODIMENT

Figure 1:
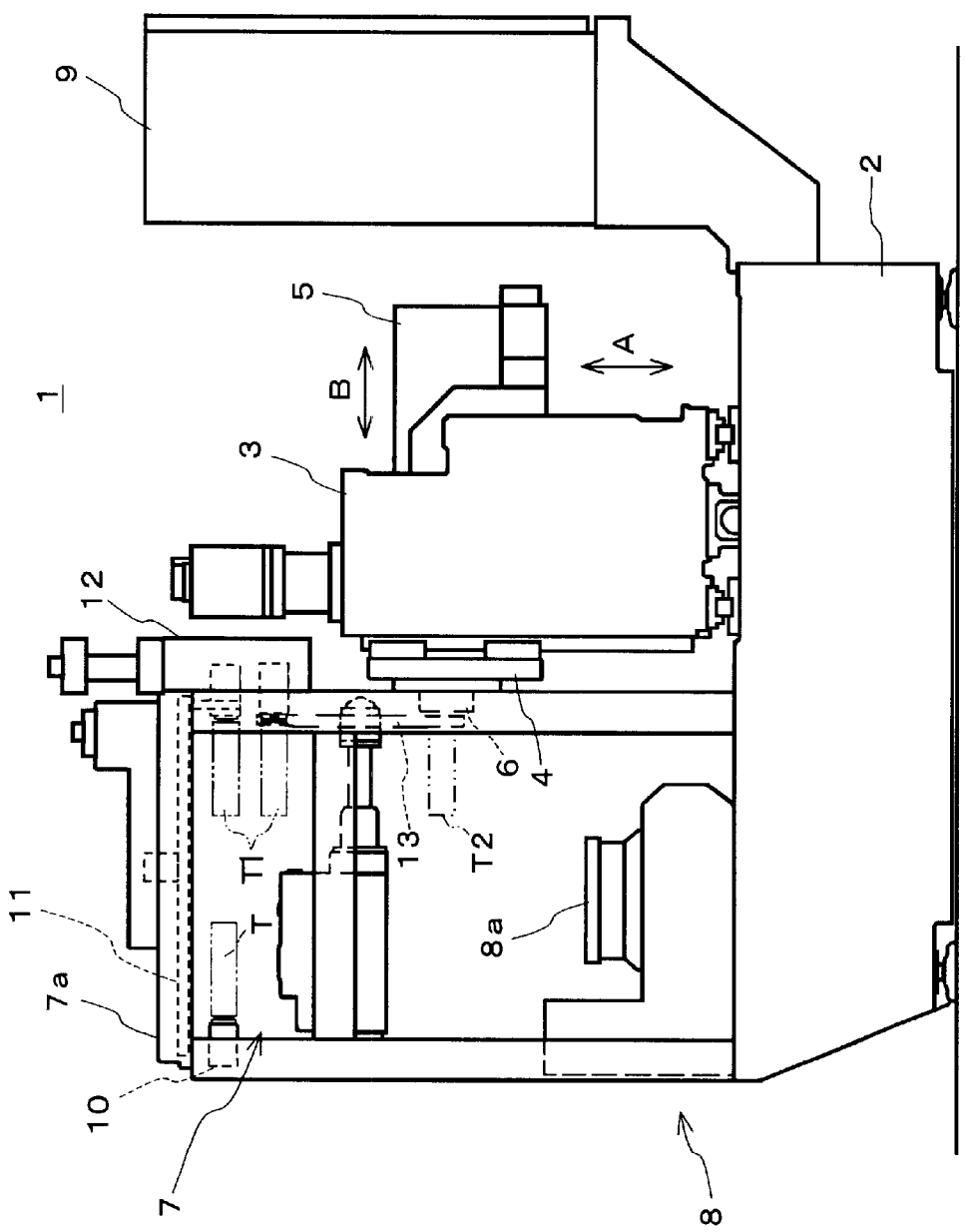
FIG. 1 is a side view of a machine tool embodying a form of the invention.
Figure 2:
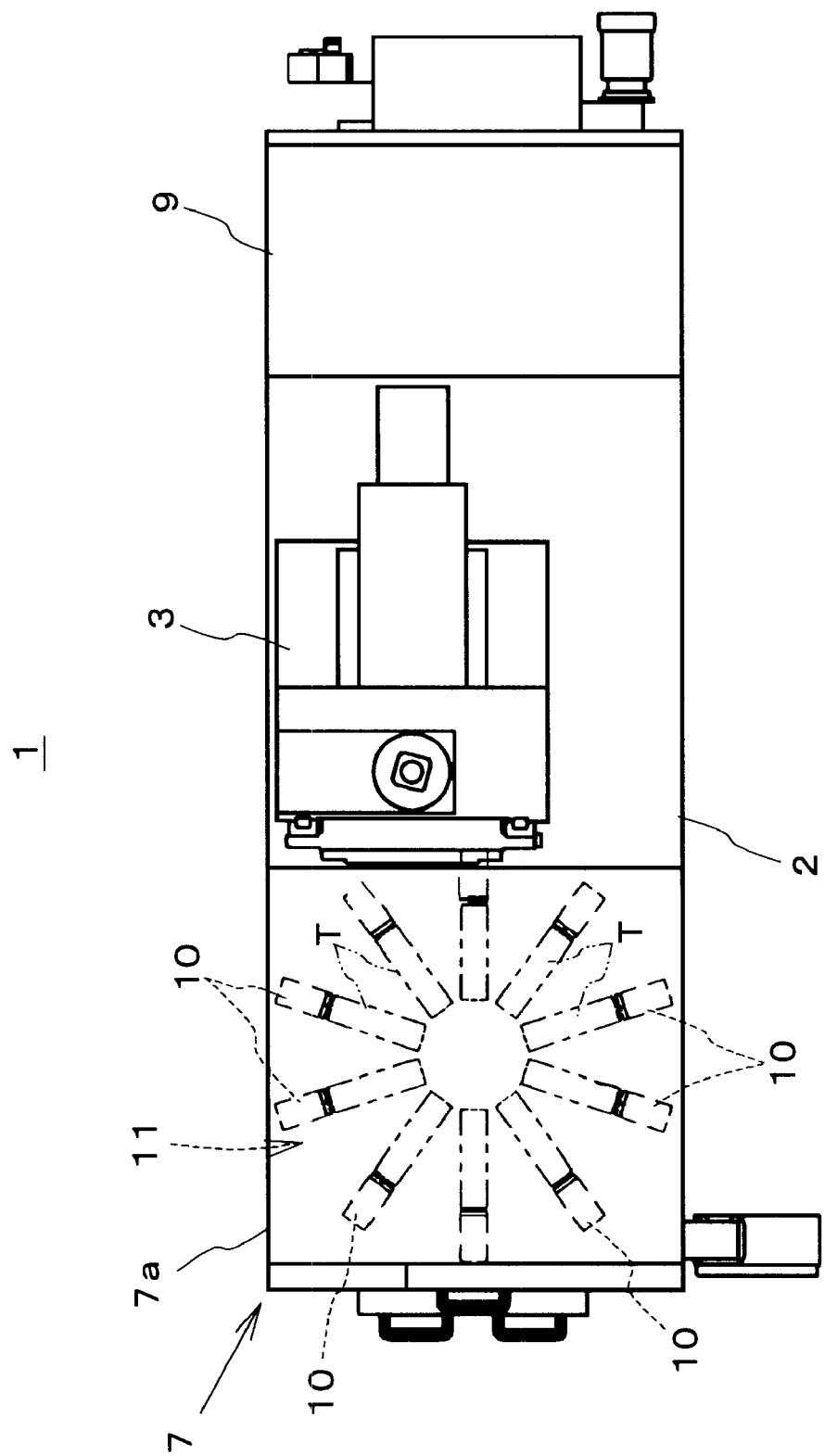
FIG. 2 is a top plan view of the machine tool in FIG.1.

As in FIG. 1 and FIG. 2, a machine tool 1 according to the embodiment is the so-called horizontal machining center. The machine tool 1 is essentially includes a bed 2, a column 3 disposed on the bed 2 and movable perpendicularly to the face of the drawing in FIG.1, a saddle 4 supported by the column 3 in a vertically movable manner (movably in the directions of arrows A in FIG. 1), a quill 5 supported by the saddle 4 movably back and forth directions (in the directions of arrows B in FIG. 1), a spindle 6 supported rotatably by the quill 5, a tool-exchange apparatus 7 disposed above the bed 2 as opposed to the column 3 for exchanging a tool T installed to the spindle 6 for the other tool T, a frame 7a supporting the tool-exchange apparatus 7, a pallet-swinging apparatus 8 for swinging a pallet 8a, a control device for controlling all working members of the machine tool 1, and the like.

As shown in FIG. 1, a tool-exchange apparatus 7 includes a tool magazine 11 having a plurality of tool pots 10 for holding the tools Ts, a transfer means 12 for transferring the tool pot 10 that holds the next tool (the tool used in the next processing) from an indexing position of the tool magazine 11 to exchanging position of the tool pot side located below the indexing position, and a tool-exchange arm 13 for exchanging the present tool T2 installed in the spindle 6 at the exchanging position of the spindle side for the next tool T1 transferred to the exchanging position of the tool pot side.

Figure 3:
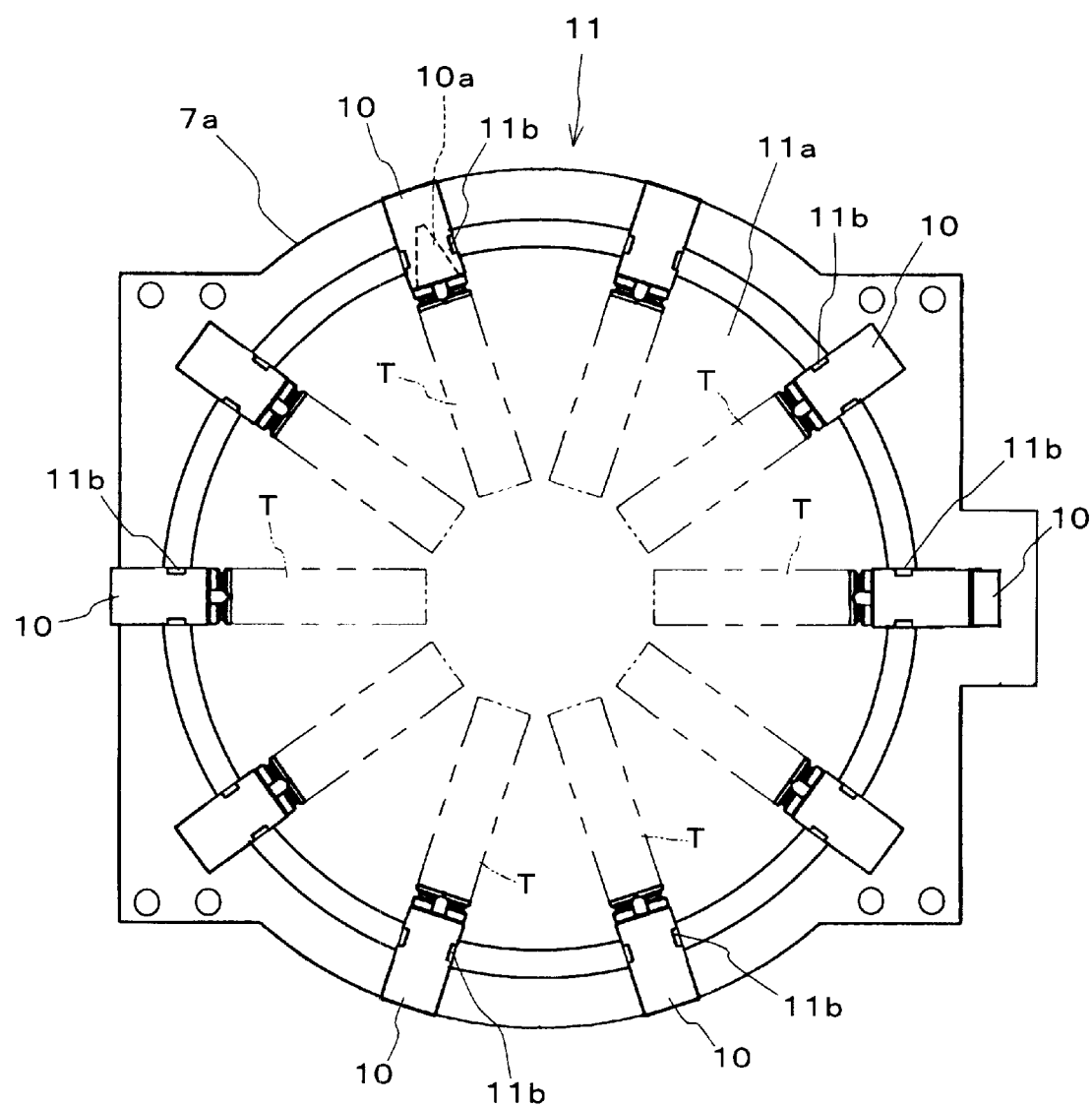
FIG. 3 is a bottom view of the tool magazine in the tool-exchange apparatus embodying a form of the invention.

The tool magazine 11 is disposed above the pallet-swinging apparatus 8 that is to say above the work process area, and the tool-exchange arm 13 is placed in the middle of the exchanging position of the spindle side defined within the work process area and the exchanging position of the tool pot side. As shown in FIG. 3, the tool magazine 11 has a plurality of gripping members 11b equally spaced away from each other. The gripping member is disposed under the disk-shaped pot supporter 11a within the circle thereof. The gripping member 11b includes a pair of gripping craws to grip outside of the tool pot 10 in attachable and detachable manner. The gripping member 11b grip the tool pots 10 so that the tool storage portion 10a of each of the tool pots is opened toward the central point of the pot supporter 11a. Hence, because the tools T are put in the openings of the tool storage portions 10a of the tool pots 10, a plurality of tools T are held under the pot supporter 11a in radial manner with the tips of tools T locking toward the central point of the pot supporter 11a.

The tool storage portion 10a of the tool pot 10 includes a catching mechanism such as a ball rock mechanism for keeping the tool T therein. Both sides of outside of the tool pot 10 define grooves 10b through which after mentioned guide rods 12b of the transfer means 12 slide, while a roller 10d is attached to an upper plane of the tool pot 10 by a fixture 10c.

Figure 4:
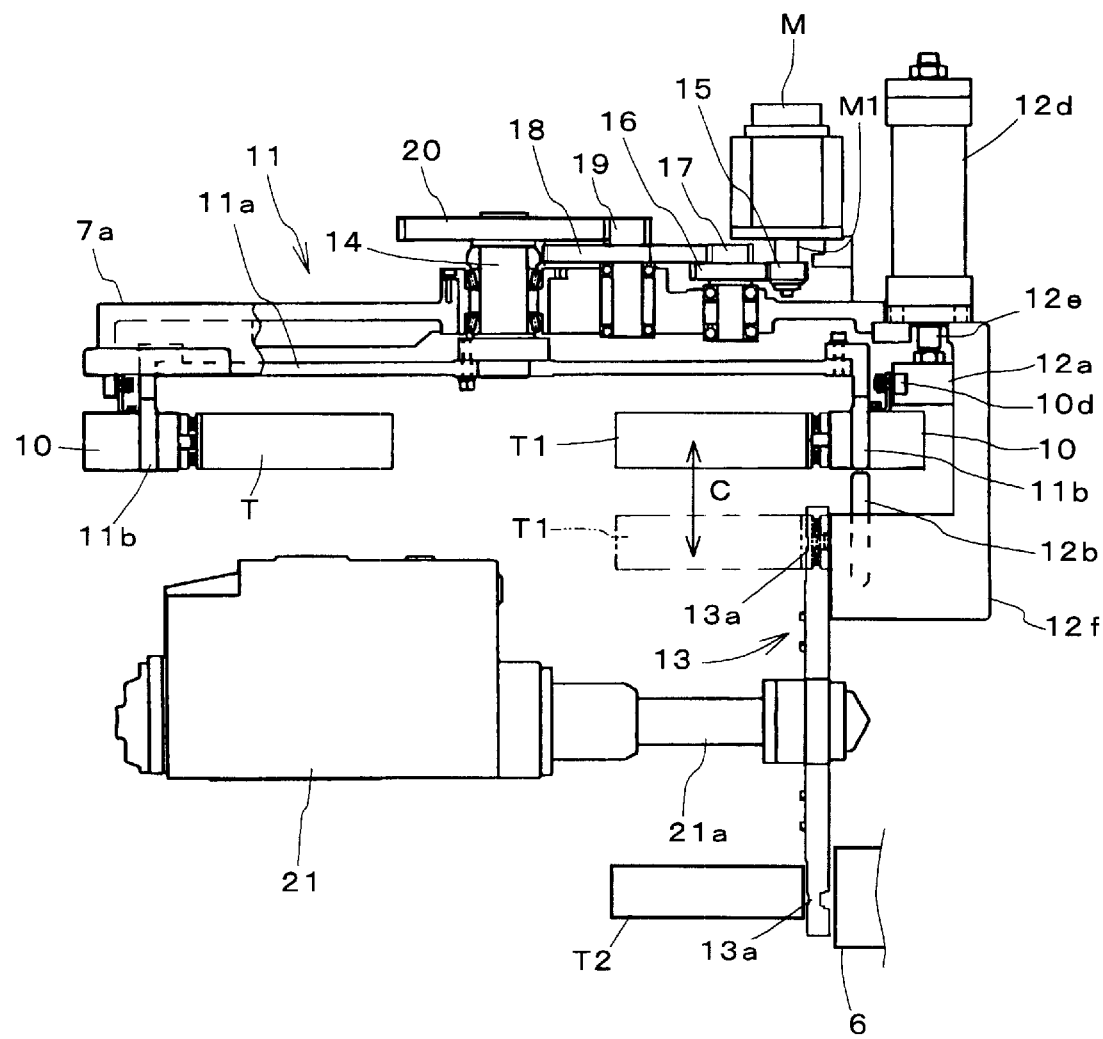
FIG. 4 is a side view of the tool-exchange apparatus embodying the invention.

As shown in FIG. 4, there is a shaft 14 on a center portion of the pot supporter 11a of the tool magazine 11. The shaft 14 has a gear 20 on the upper end thereof and is rotatably supported by a frame 7a. The frame 7a rotatably supports gears 16, 17, 18, and 19, too. And the gear 20 is turned by the gear 15 on the output shaft M1 of the electric motor M installed in the frame 7a, through the gears 16, 17, 18,and 19 with meshing both the gears 15 and 16, 17 and 18, 19 and 20.

Thus, the pot supporter 11a of the tool magazine 11 rotates with within a horizontal plane due to a reception of a drive force of the electric motor M, whereby the tool pot 10 holding the next tool T1 is indexed at the indexing position for exchanging tools. A diameter of the pot supporter 11a is defined equal to or shorter than a width dimension of the bed 2, and a rotary center of the pot supporter 11a is provided to be consistent with a central axis of the bed 2 for preventing the tool pot 10 from protruding outwardly of the bed 2 (in plan) when the pot supporter 11a rotates.

Figure 5:
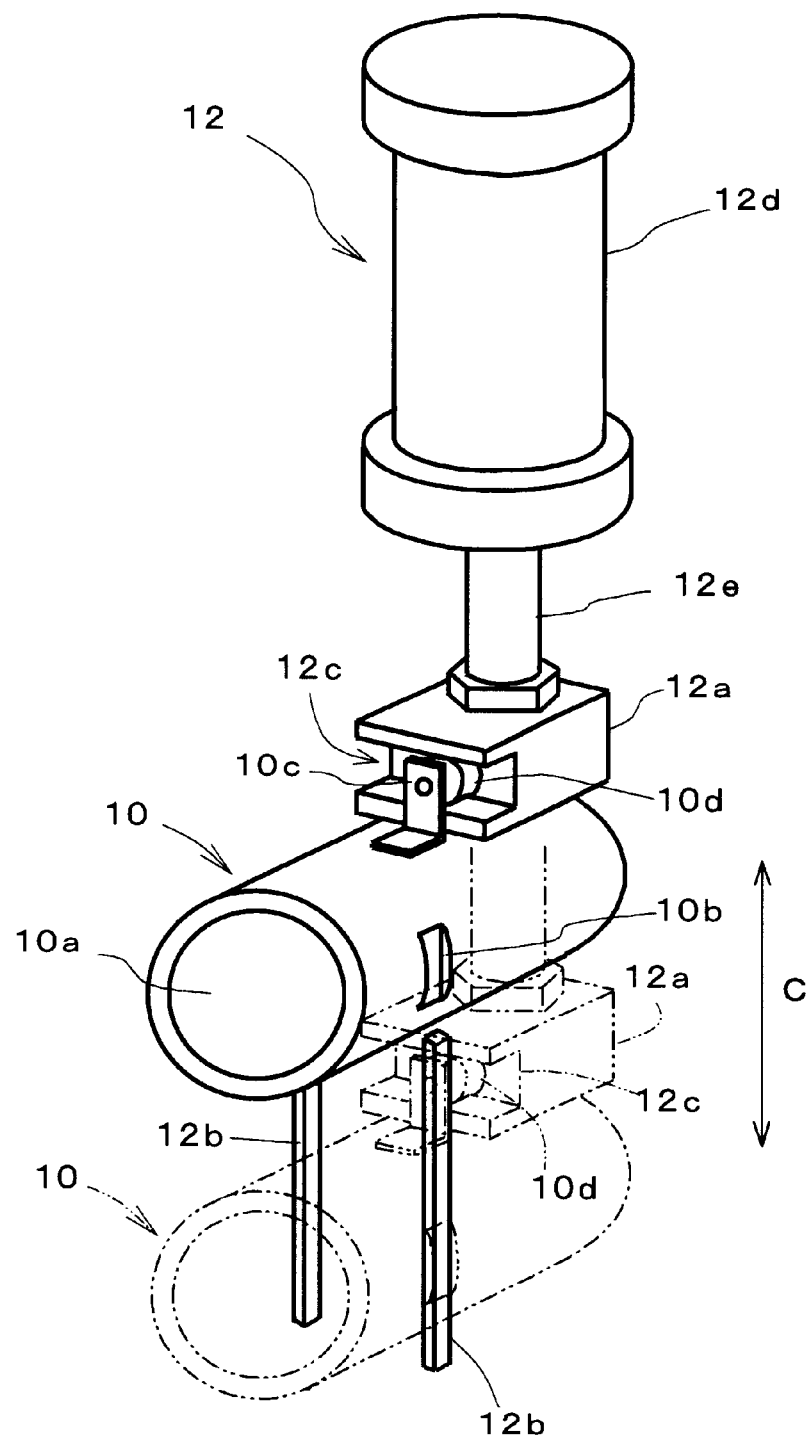
FIG. 5 is a perspective view of a transfer means of the tool-exchange apparatus embodying the invention.

As shown in FIG. 4 and FIG. 5, the transfer means 12 is adapted to move engaging means 12a up and down in the direction of an arrow C in FIG. 4 by means of a pneumatic or hydraulic drive cylinder 12d fixed to the frame 7a. The tool pot 10 indexed at the indexing position is stopped by the engaging means to be lowered along the guide rod 12b, whereby the tool pot 10 is released from the gripping member 11b of the tool magazine 11 and transferred to the exchanging position of the pot side.

The engaging means 12a is installed in a tip of a rod 12e of the drive cylinder 12d and defines a engaging groove 12c at a side opposing to the tool magazine 11. The engaging means 12a moves up and down between an elevated upper end position and the exchanging position of the pot side. When the engaging means 12a is at the elevated upper end position, the engaging groove 12c is at the same level of the roller 10d of the tool pot 10, while the roller 10d of the tool pot 10 passes through the engaging groove 12c due to a rotation of the pot supporter 11a. Further, when the tool pot 10 holding the next tool T1 is indexed at the indexing position, the roller 10*d* of the tool pot 10 is placed inside of the engaging groove 12*c* of the engaging means 12*a*.

A pair of guide rods 12*b* is disposed just under the tool pot 10 that is indexed at the indexing position. The tool pot 10 is placed between said pair of guide rods 12*b* at the same time when released from the gripping member 11*b* of the tool magazine 11, thereafter said pair of guide rods 12*b* slide in the groove 10*b* of the tool pot 10 with keeping horizontal postures thereof, wherein the guide rods 12*b* are held by a guide holding body 12*f* which is perpendicularly hung from the frame 7*a*.

The intermediate portion of the tool exchange arm 13 is firmly installed in an arm shaft 21*a* of a horizontally arranged drive unit 21. The arm shaft 21*a* is rotated by a rotating means (not shown). Thus, the tool exchange arm 13 horizontally moves back and forth to the next tool T1 held by the tool pot 10 at the exchanging position of the pot side and the present tool T2 installed in the spindle 6 at the exchanging position of the spindle side. And the exchanging arm 13 turns within a vertical plane. There are gripping members 13*a*, 13*a* for gripping the tools T respectively at each end of the tool exchange arm 13. Hence, the tool exchange arm 13 turns, and the gripping members 13*a*, 13*a* grip respectively the next tool T1, held by the tool pot 10 at the exchanging position of the pot side, and the present tool T2, installed in the spindle 6 at the exchanging position of the spindle side, when the tool exchange arm 13 is in a vertical posture as shown in FIG. 4.

The length of the tool exchange arm 13 is set shorter than the width dimension of the bed 2. The rotary center of the tool exchange arm 13 is consistent with the center of the bed 2 in the width direction thereof. The arm shaft 21*a* of the drive unit 21 is provided to be in parallel with the central axis of the bed 2. Thus, the tool exchange arm 13 doesn't protrude outwardly from the bed 2 (in plane) even though said tool exchange arm 13 turns within the vertical plane.

A shutter (not shown) is placed between an arrangement area of the tool-exchange apparatus 7 and the work process area. The shutter closes during a work process time for separating the arrangement area of the tool-exchange apparatus 7 from the work process area so that cutting oil and chip are prevented from being stuck to the tool-exchange apparatus 7, on the other hand, opens during an after mentioned tool exchange time for enabling the tool exchange.

In the tool-exchange apparatus 7 of the embodiment as described above, the present tool T1 installed in the spindle 6 is exchanged for the next tool T2 held by the tool magazine 11 like the following. Hereupon, the tool exchange arm 13 is in the forward position and keeps a horizontal posture.

Firstly, the electric motor M is driven to rotate the pot supporter 11*a* of the tool magazine 11 for indexing the tool pot 10 holding the next tool T1 at the indexing position. Next, the drive cylinder 12*d* is driven to move the engaging means 12*a* of the transfer means 12 downwardly for transferring the tool pot 10 holding the next tool T1 from the indexing position of the tool magazine 11 to the exchanging position of the pot side. At that time, the tool pot 10 keeps a horizontal posture in such a manner that the guide rod 12*b* is slid into the groove 10*b* of the tool pot 10, thus the tool pot 10 is guided by the guide rod 12*b* to move down to the exchanging position of the pot side.

On the other hand as shown in FIG. 1, by appropriately shifting the column 3 in such perpendicular direction to the face of the drawing in FIG. 1, the saddle 4 in the directions of arrows A in FIG. 1, and the quill 5 in the direction of an arrow B in FIG. 1, the spindle 6 provided with the present tool 2 is placed at the exchanging position of the spindle side.

Secondary, the tool exchange arm 13 is turned (hereinafter such turning direction is called a positive direction) so that said tool exchange arm 13 is kept vertically, whereby the present tool T2 installed in the spindle 6 at the exchanging position of the spindle side and the next tool T1 held by the tool pot 10 at the exchanging position of the pot side are gripped by both of the gripping members 13*a*, 13*a* of the tool exchange arm 13. Next, when the arm shaft 21*a* of the drive unit 21 is moved backward, the tool exchange arm 13 retreats leftward as shown in FIG. 4, thus the next tool T1 is pulled out of the tool pot 10 while the present tool T2 is pulled out of the spindle 6.

Thirdly, after the tool exchange arm 13 is rotated by 180 degrees in the positive direction within a vertical plane for reversing the positions of the next tool T1 and the present tool T2, the arm shaft 21*a* of the drive unit 21 is moved forward to move the tool exchange arm 13 rightward as shown in FIG. 4, thus the present tool T2 is held by the tool pot 10 and the next tool T1 is installed in the spindle 6. After the release of the present tool T1 and the next tool T2 from the gripping members 13*a* by turning the tool exchange arm 13 in the opposite direction by 90 degrees, the drive cylinder 12*d* is driven to elevate the engaging means 12*a* of the transfer means 12, whereby the tool pot 10 is stored in the tool magazine 11, that is to say, the tool pot 10 is gripped by the gripping member 11*b* of the tool pot 10. Thus, the present tool T2 is completely exchanged for the next tool T1.

As described above, in the tool-exchange apparatus of the present invention, the tool T is held by each opening of the tool storage portion 10*a* of a plurality of tool pots 10 which are arranged in a planar and radial manner, and the tips of the tools T are all centrally directed as shown in FIG. 2, said tools T held by the tool pots 10 never protrude outside of the bed 2 (in plane). Further, the width of the machine tool 1 can be set as closely to as that of the bed 2 whereby the width dimension of the machine tool 1 can be made compact owing to the arrangement of the tool magazine 11 provided above the work process area. As a result, even when constructing a manufacture line such as a transfer machine wherein many machine tools are arranged in parallel, each machine tool 1 can be arranged as closely as possible to one another, whereby an area to install the whole manufacture line can be made small so as to heighten production efficiency. On the other hand, the tool T can be detached from the tool pot 10 at the side facing to the main spindle 6 that is to say the front side thereof whereby the tool T can be easily detached from the tool pot 10 owing to the arrangement of the tool magazine above the work process area.

As shown in FIG. 1, the tool magazine 11, the engaging means 12*a* of the transfer means 12, and the tool exchange arm 13 are longitudinally arranged in parallel with each other, whereby the exchanging position of the pot side to which the tool pot 10 indexed at the indexing position is transferred can be set just under said indexing position, thus each tool T never protrudes outside of the bed 2 during the exchange of the tools, consequently the width of the machine tool 1 can be made compact.

Even though the tool magazine 11 is set above the work process area, the tool magazine 11 doesn't unwillingly protrude above the machine tool 1 because the tool T is horizontally held by the tool magazine 11, thus the height of the machine tool 1 also can be made compact, and as a result, operator can easily detach the tool T from the tool pot 10, attach another tool to the tool pot 10 and do other operations in relation to maintenance and the like without any difficulty.

Although the invention has been described in its specific embodiment, it is to be distinctly understood that the invention is not limited thereto but may be otherwise variously embodied within the scope of the following claims.

What is claimed is:

1. A tool-exchange apparatus for a machine tool including;
   a tool magazine defined by a plurality of tool pots which are arranged on the same circumference of a circle and equally spaced away from each other, and each of the tool pots has an opening for putting a tool therein facing toward the center of the circle whereby a plurality of tools are held by the tool magazine in a radial manner,
   wherein a selected tool pot is indexed at an indexing position to exchange a present tool installed in a spindle of the machine tool for a next tool held by the tool magazine with a tip of the next tool looking toward the center of the circle,
   wherein the tool magazine is arranged above a work process area having an exchanging position of the spindle side of the machine tool and revolves the tool pots around the center of the circle within a horizontal plane for indexing the tool pots at the indexing position, further including;
   a transfer means for transferring the selected tool pot indexed at the indexing position to the exchanging position of a tool pot side which is located below the indexing position; and
   a tool exchange arm which exchanges the present tool in the exchanging position of the spindle side for the next tool in the exchanging position of the tool pot side.

2. A tool-exchange apparatus as set forth in claim 1, the transfer means comprising:
   an engaging means in engagement with the selected tool pot for moving between the indexing position and the exchanging position of the tool pot side; and
   an elevating means for moving the engaging means up and down between the indexing position and the exchanging position of the tool pot side.

* * * * *